(12) United States Patent
Hastings et al.

(10) Patent No.: US 7,713,157 B2
(45) Date of Patent: May 11, 2010

(54) PLANETARY GEAR CONTROLLED ALTERNATOR

(75) Inventors: Jerome Kenneth Hastings, Sussex, WI (US); Roger James Briggs, Colgate, WI (US); Vijay Bhavaraju, Germantown, WI (US)

(73) Assignee: Eaton Corporation, Cleveland, OH (US)

( * ) Notice: Subject to any disclaimer, the term of this patent is extended or adjusted under 35 U.S.C. 154(b) by 368 days.

(21) Appl. No.: 11/776,211

(22) Filed: Jul. 11, 2007

(65) Prior Publication Data

US 2009/0015212 A1    Jan. 15, 2009

(51) Int. Cl.
*F16H 3/72* (2006.01)
*F16H 37/06* (2006.01)
*H02K 7/10* (2006.01)
*H02K 7/18* (2006.01)
*H02K 23/52* (2006.01)
*F02B 63/04* (2006.01)
*H02P 9/04* (2006.01)

(52) U.S. Cl. .................... 475/2; 475/4; 475/5; 290/1 C; 290/5; 290/46

(58) Field of Classification Search ...................... 475/2, 475/4, 5, 182, 331; 290/1 C, 5, 46
See application file for complete search history.

(56) References Cited

U.S. PATENT DOCUMENTS

| 2,911,541 | A | * | 11/1959 | Neufville et al. ............ 290/4 R |
|---|---|---|---|---|
| 3,240,083 | A | * | 3/1966 | Stoddard ...................... 475/94 |
| 3,699,351 | A | * | 10/1972 | Addie .......................... 290/14 |
| 4,439,720 | A | | 3/1984 | Georges |
| 5,445,572 | A | * | 8/1995 | Parker ......................... 475/182 |
| 5,557,977 | A | | 9/1996 | Stockton |
| 6,468,175 | B1 | * | 10/2002 | Lehongre ....................... 475/5 |
| 6,609,992 | B2 | * | 8/2003 | Kusumoto et al. ........... 475/318 |
| 6,863,139 | B2 | * | 3/2005 | Egami et al. ................ 180/53.8 |
| 6,984,188 | B2 | * | 1/2006 | Potter et al. ................. 475/298 |
| 7,377,875 | B2 | * | 5/2008 | Shiina et al. ................. 475/339 |
| 7,399,252 | B2 | * | 7/2008 | Kingston ..................... 475/331 |
| 7,547,264 | B2 | * | 6/2009 | Usoro ............................ 475/5 |

\* cited by examiner

*Primary Examiner*—Tisha D Lewis
(74) *Attorney, Agent, or Firm*—Martin J. Moran

(57) ABSTRACT

An alternator system includes an input shaft, a planetary gear assembly, a variable resistance generator, and a control unit. The alternator assembly is structured to produce an output current having a frequency. The planetary gear assembly disposed between, and operatively coupled to, the input shaft and the alternator assembly. The planetary gear assembly has a planet gear carrier body with an outer radial surface having teeth. The variable resistance generator has an external generator shaft with a generator gear. The generator gear is structured to engage the outer radial surface teeth. The control unit structured to detect the frequency of the alternator assembly output current and to alter the resistance of the generator. The control unit is structured to maintain the frequency of the alternator assembly output current within a selected range by increasing or decreasing the resistance of the generator.

14 Claims, 2 Drawing Sheets

PLANETARY GEAR CONTROLLED ALTERNATOR

BACKGROUND OF THE INVENTION

1. Field of the Invention

The present invention relates to an alternator and, more specifically, to an alternator coupled to a drive via an adjustable speed planetary gear assembly.

2. Background Information

As is well known in the art, an alternator is a device structured to convert energy from a rotational motion into an alternating current. Generally, an alternator spins a magnet, or rotor, within an alternator housing and this spinning magnet induces electric currents in a set of stationary wire coils, or the stator. Most engine powered road vehicles include an alternator and the following description shall use a heavy-duty truck as an example; however, it is understood that the claimed invention may be used with any type of alternator and is not limited to vehicular use. That is, the invention relates to an alternator wherein the rotor is likely to spin at various speeds. Thus, the invention may be used in conjunction with other devices such as, but not limited to, a windmill structured to produce electricity. In a vehicle, an engine provides a source of rotation, such as, but not limited to the drive shaft or crank shaft. The source of rotation is coupled, typically, via a belt and/or shaft to a shaft that is fixed to the rotor and has an end extending outside the alternator housing, hereinafter a "rotor shaft assembly". Thus, when the engine is operating, the source of rotation causes the rotor to rotate and creates the alternating current.

While this configuration is satisfactory, it does have disadvantages. For example, because the speed of the rotor is linked to the speed of the source of rotation, the frequency of the alternating current is directly dependent upon the speed of the source of rotation. This can be a disadvantage as the engine speed, as used in this example, typically varies between 600 to 2400 rpm which results in the frequency of the current varying between about 150 and 600 Hz. It would be advantageous to maintain the frequency of the current within a selected range between about 50 and 70 Hz, and more preferably about 60 Hz.

SUMMARY OF THE INVENTION

At least one embodiment of the claimed invention provides for a planetary gear assembly disposed between, and operatively coupled to, a source of rotation and a rotor shaft assembly. The planetary gear assembly is further coupled to a generator that acts as an electromagnetic brake. By controlling the strength of the electromagnetic brake, that is, by controlling the resistance of the generator, the speed of the rotor, and therefore the frequency of the current, may be controlled. Further, a control unit may monitor the frequency of the output current and adjust the resistance of the generator in response to changes in the frequency of the output current. In this manner, that is, by maintaining the rotational speed of the planetary gear assembly within a selected range, the frequency of the output current may be maintained within a selected range.

Further, while in the preferred embodiment the source of rotation is variable, the invention may also be used in a configuration wherein the source of rotation moves at a constant speed that is too fast or too slow to produce a current with the desired frequency.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are so coupled to move as one.

As used herein, "operatively engage" when used in reference to gears, or other components having teeth, means that the teeth of the gears engage each other and the rotation of one gear causes the other gear to rotate as well.

As used herein, an "increased mass" means that a component has a larger size than is structurally required, is made from a heavier material than is required, or has a heavy material incorporated therein for the purpose of increasing mass. For example, a steel gear having lead weights coupled thereto has an "increased mass."

Figure 1:
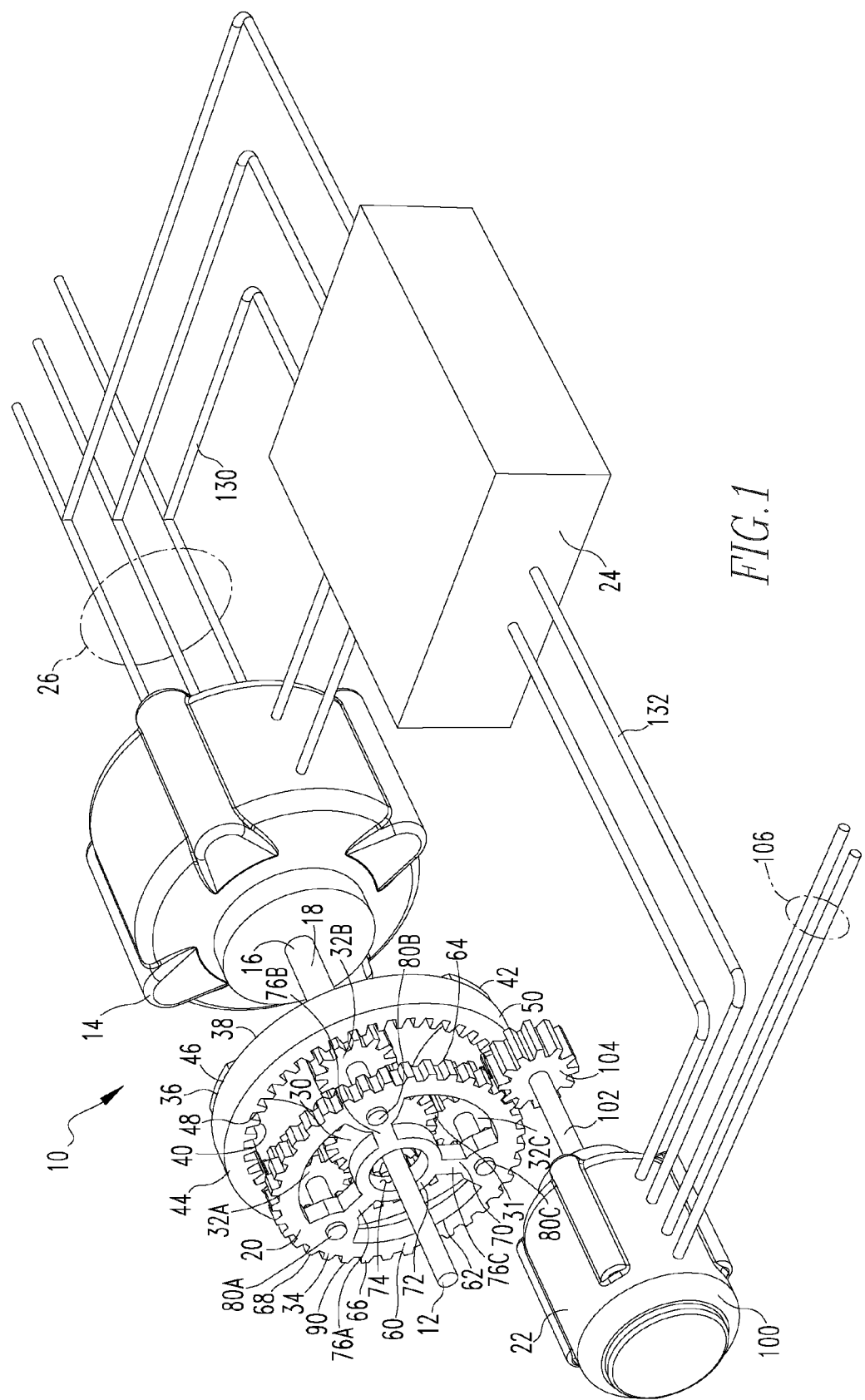
FIG. 1 is an isometric view of an alternator system having a planetary gear assembly.
Figure 2:
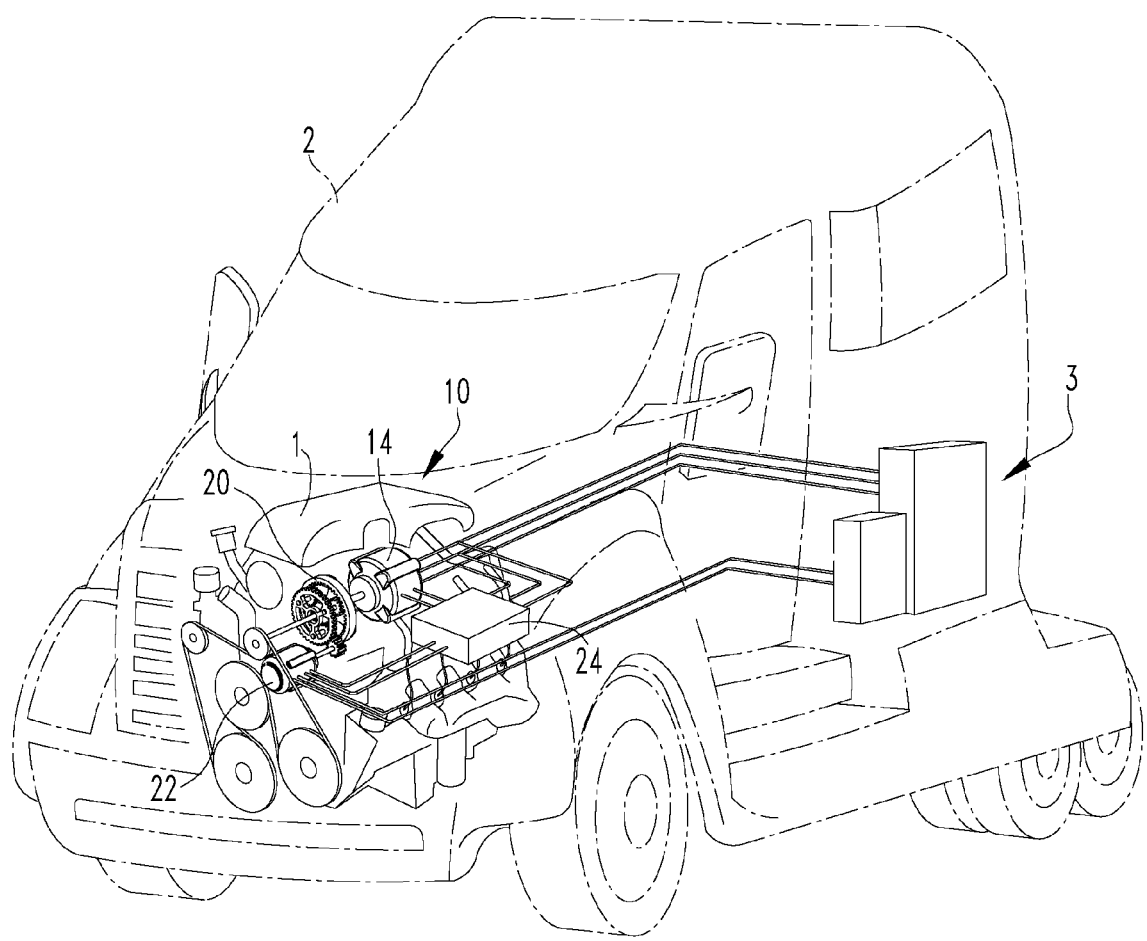
FIG. 2 is a schematic view of an alternator system having a planetary gear assembly within a vehicle.

As shown in FIG. 1, an alternator system 10 includes an input shaft 12, an alternator assembly 14 having a rotor shaft assembly 16 with an exposed end 18, a planetary gear assembly 20, a variable resistance generator 22, and a control unit 24. The input shaft 12 is operatively coupled to a source of rotation such as, but not limited to, an internal combustion engine 1 within a vehicle 2. That is, the source of rotation is coupled to the input shaft 12 so that the input shaft 12 rotates in response to energy provided by the source of rotation. Preferably, the source of rotation, and therefore the input shaft 12, rotates at speeds between about 600 and 2400 rpm. The alternator assembly 14 further includes a plurality of output conductors 26. As is known in the art, the alternator assembly 14 generates an alternating output current having a frequency. The output current is carried through the alternator output conductors 26.

The planetary gear assembly 20 includes a sun gear 30, at least two, and preferably three, planet gears 32A, 32B, 32C, a planet gear carrier 34, and a ring gear 36. The sun gear 30 is fixed to the input shaft 12 and rotates therewith. The sun gear 30 is generally circular and has external teeth 31. The ring gear 36 has a generally flat, torus shaped body 38 having internal teeth 40 and a support member 42. The ring gear torus shaped body 38 has a first face 44, a second face 46, an inner radial surface 48 and an outer radial surface 50. The ring gear internal teeth 40 are disposed on the ring gear body inner radial surface 48. The support member 42 is coupled to the ring gear body second face 46 and extends across the center of the ring gear body 38. The support member 42 does not extend into the space defined by the ring gear body inner radial surface 48. The rotor shaft assembly exposed end 18 is fixedly coupled to the support member 42 and is aligned with the center of the ring gear body 38. In this configuration the rotor shaft assembly 16 rotates with the ring gear 36.

The planet gear carrier 34 has a generally flat, preferably torus shaped body 60. The planet gear carrier body 60 has a first face 62, a second face 64, an inner radial surface 66 and an outer radial surface 68. The planet gear carrier 34 also has a planet gear support member 70 disposed in the space defined by the planet gear carrier inner radial surface 66. The planet gear body support member 70 has a central torus shaped member 72 defining a medial opening 74 and one support arm 76 for each planet gear 32A, 32B, 32C. Thus, where there are three planet gears 32A, 32B, 32C, there are three support arms 76A, 76B, 76C. Each support arm 76A, 76B, 76C extends between the central torus shaped member 72 and the planet gear body carrier inner radial surface 66. Preferably, the support arms 76A, 76B, 76C are generally evenly spaced about the central torus shaped member 72. Thus, where there are three support arms 76A, 76B, 76C, the support arms 76A, 76B, 76C are spaced about 120 degrees from each other. Each support arm 76A, 76B, 76C has a pivot member 80A, 80B, 80C extending generally axially relative to the planet gear carrier body 60 adjacent to the planet gear body carrier second face 64. Each pivot member 80A, 80B, 80C is structured to support a planet gear 32A, 32B, 32C. The planet gear carrier body outer radial surface 68 has a plurality of teeth 90. The planet gear carrier body outer radial surface teeth 90 are structured to operatively engage the generator gear 104 on the variable resistance generator 22, described below.

The variable resistance generator 22 is, preferably, a DC generator having a 12 volt output, or an output that may be converted into a 12 volt output. Externally, the variable resistance generator 22 includes a housing 100, a generator shaft 102, a generator gear 104, and an output conductor 106. The generator shaft 102 extends from outside of the generator housing 100 into the generator housing 100 and is coupled to the generator mechanism (not shown). The generator gear 104 is fixedly coupled to the external portion of the generator shaft 102. The generator mechanism is disposed within the generator housing 100 and is structured to provide a variable resistance. That is, as is known in the art, a generator mechanism typically includes a rotor (not shown) having an armature coil (not shown) disposed thereon and a stator (not shown) having field coils (not shown) wound thereon. The generator rotor is fixed to the generator shaft 102. When an input current is supplied to the field coils, a magnetic field is created in the generator mechanism. An alternating output current is generated in the armature coil when it moves in this magnetic field. The output current is converted to direct current and is coupled to a vehicle electrical system 3. As is known, due to the natural phenomena identified as Lenz's law, induction always tends to oppose whatever causes it. Therefore, the magnetic field applies a counter torque to the movement of the generator rotor and therefore to the generator shaft 102. This counter torque provides a braking action on the generator rotor and the generator shaft 102. The induced current and the counter torque are proportional to the strength of the magnetic field created by the input current. Varying the amount of input current supplied to the field coils varies the strength of the magnetic field and the braking action on the generator rotor. Therefore, adjusting the amount of input current supplied to the field coils can control the amount of braking and the resulting output speed of the planetary gear assembly 20.

The control unit 24 is structured to monitor the frequency and amplitude of the alternator assembly 14 output voltage and to alter the variable resistance generator 22 field current, and thereby alter the resistance of the variable resistance generator 22. The control unit 24 is further structured to adjust the field current in the alternator to maintain the proper alternator voltage amplitude. Thus, in the preferred embodiment, the control unit 24 includes sensor feeds 130 coupled to at least one of the alternator output conductors 26 and a control feed 132 coupled to the generator mechanism. As is known in the art, the control unit 24 includes a programmable logic circuit or similar device (not shown) structured, or programmed, to perform the monitoring and control functions. The control unit 24 monitors the frequency of the output current and alters the resistance of the variable resistance generator 22, that is, the control unit 24 alters the input current, so that the frequency of the output current is maintained within a selected range, as describe below.

When assembled, the alternator system 10 has the input shaft 12 extending through the planet gear support member medial opening 74. The sun gear 30 is fixedly coupled to the input shaft 12 and disposed adjacent to the planet gear carrier body second face 64. Each planet gear 32A, 32B, 32C is rotatably disposed on a planet gear carrier support arm pivot member 80A, 80B, 80C. Each planet gear 32A, 32B, 32C operatively engages the sun gear 30. The ring gear 36 is disposed about the planet gears 32A, 32B, 32C and operatively engages the planet gears 32A, 32B, 32C. That is, the ring gear 36 internal teeth 40 operatively engages each of the planet gears 32A, 32B, 32C. In this configuration, the planetary gear assembly 20 is disposed between, and operatively coupled to, both the input shaft 12 and the rotor shaft assembly 16. Thus, as the input shaft 12 rotates, the rotor shaft assembly 16 rotates and the alternator assembly 14 produces the alternator output current. Further, the frequency of the alternator output current is functionally related to the speed of rotation of the ring gear 36. That is, the faster the ring gear 36 rotates, the higher the frequency of the alternator output current.

It is further noted that, unlike many planetary gear assemblies, the disclosed planetary gear assembly 20 does not include a fixed member. That is, in many planetary gear assemblies either the ring gear or the planet gear carrier is fixed to a stationary member. The planetary gear assembly 20 of the present invention allows both the planet gear carrier 34 and the ring gear 36 to rotate. Thus, neither the planet gear carrier 34 or the ring gear 36 is directly coupled to a non-rotating element. In this configuration, rotation of the sun gear 30 is transferred to the non-fixed members. As described above, the planetary gear assembly 20 does not include a fixed member so that each of the sun gear 30, the planet gears 32A, 32B, 32C, the ring gear 36 and the planet gear carrier 34 may rotate. This configuration allows for "slippage" in the planetary gear assembly 20, as described below.

In this configuration, the frequency of the alternator output current is a function of the speed of rotation of the ring gear 36. To show how the speed of rotation of the ring gear 36 is controlled by the control unit 24 and/or the variable resistance generator 22, the following three examples are provided. In the first example, the planet gear carrier 34 is locked in place; in the second example, the planet gear carrier 34 is free to rotate without any restriction; and in the third example, which embodies the disclosed invention, the planet gear carrier 34 rotation is controlled by the control unit 24 and/or the variable resistance generator 22. Thus, in the first example, assume that the variable resistance generator 22 has an infinite resistance, that is, the generator gear 104 is locked in place. If the generator gear 104 is locked in place, the planet gear carrier 34 which operatively engages the generator gear 104 is also locked in place. If the source of rotation is operating at a constant speed, the input shaft 12 and the sun gear 30 will rotate at a constant speed. The rotation of the sun gear 30 is transferred to the planet gears 32A, 32B, 32C. The planet gears 32A, 32B, 32C rotate relative to the pivot members 80A, 80B, 80C at a constant speed as well. The planet gear carrier 34, in this example, is locked in place, thus, the rotation of the planet gears 32A, 32B, 32C is passed directly to the ring gear 36 which also rotates at a constant speed. The rotation of the ring gear 36 is passed to the rotor shaft assembly 16 and the alternator assembly 14 produces the alternator output current at a constant frequency. However, if the source of rotation changes speed, e.g. the engine speeds up or slows down, the speed of the ring gear 36, as well as all the gears coupled thereto as described above, will also change and the frequency of the alternator output current will change.

Conversely, assume that the variable resistance generator 22 has no, or negligible, resistance, that is, the generator gear 104 is free to rotate. If the generator gear 104 is free to rotate, the planet gear carrier 34 which operatively engages the generator gear 104 is also free to rotate. Again if the source of rotation is operating at a constant speed, the input shaft 12 and the sun gear 30 will rotate at that constant speed. The rotation of the sun gear 30 is transferred to the planet gears 32A, 32B, 32C. The planet gears 32A, 32B, 32C rotate relative to the pivot members 80A, 80B, 80C at a constant speed as well. The planet gear carrier 34, in this example, is free to rotate, thus, a first portion of the rotational motion, or energy, is passed from the planet gears 32A, 32B, 32C to the planet gear carrier 34. A second portion of the rotational motion, or energy, is passed from the planet gears 32A, 32B, 32C to the ring gear 36. The division of energy passed to either the planet gear carrier 34 or the ring gear 36 is controlled by many factors such as, but not limited to, the load on the alternator assembly 14, the load on the variable resistance generator 22, the mass of the planet gear carrier 34 relative to the ring gear 36, and the various frictional loads between the many moving components. However, each of the components of the planetary gear assembly 20 will, eventually, reach a constant rotational speed. Again, the rotation of the ring gear 36 is passed to the rotor shaft assembly 16 and the alternator assembly 14 produces the alternator output current at a constant frequency. Further, if the source of rotation changes speed, e.g. the engine speeds up or slows down, the speed of each of the components of the planetary gear assembly 20 will change and the frequency of the alternator output current will change.

However, as disclosed above, the control unit 24 and/or the variable resistance generator 22 allows for the control of the speed of rotation of the planet gear carrier 34 and, as such, allows for the control of the frequency of the alternator output current. That is, the generator gear 104 operatively engages the planet gear carrier body outer radial surface teeth 90. Thus, as the planetary gear assembly 20 rotates, the generator gear 104 also rotates. Further, the resistance created by the variable resistance generator 22 effects the rotation of the planetary gear assembly 20. That is, the variable resistance generator 22 acts as a brake on the planet gear carrier 34. If all other factors remain constant and the resistance of the variable resistance generator 22 is increased, the speed of rotation of the planet gear carrier 34 is decreased. Conversely, if the resistance of the variable resistance generator 22 is decreased, the speed of rotation of the planet gear carrier 34 is increased.

Thus, while the rotational motion created by the input shaft 12 and passed through the sun gear 30 and the planet gears 32A, 32B, 32C is, essentially, divided between the planet gear carrier 34 and the ring gear 36, by adjusting the resistance created by the variable resistance generator 22 the freedom of the planet gear carrier 34 to rotate is controlled. Further, any rotational motion/energy not taken by the planet gear carrier 34 will be transferred to the ring gear 36 and on to the alternator assembly 14. Thus, if the resistance created by the variable resistance generator 22 is increased, the planet gear carrier 34 will rotate more slowly and the ring gear 36 will rotate more rapidly. Conversely, if the resistance created by the variable resistance generator 22 is decreased, the planet gear carrier 34 will rotate more quickly and the ring gear 36 will rotate slowly. As noted above, the ring gear 36 is fixed to the rotor shaft assembly 16 which defines the speed at which the alternator assembly 14 rotor rotates which further determines the frequency of the alternator assembly 14 output current.

As noted above, the control unit 24 is structured to detect the frequency of the alternator assembly 14 output current and to alter the resistance of the variable resistance generator 22. More specifically, the control unit 24 is structured to maintain the frequency of the alternator assembly 14 output current in a selected range. When the control unit 24 detects that the frequency of the alternator assembly 14 output current is too high, the control unit 24 decreases the resistance of the variable resistance generator 22. When the resistance of the variable resistance generator 22 is decreased, the speed of rotation of the planet gear carrier 34 increases and the speed of rotation of the ring gear 36, and the rotor shaft assembly 16, decreases. As the speed of rotation of the ring gear 36 decreases, the frequency of the alternator assembly 14 output current also decreases. Conversely, when the control unit 24 detects that the frequency of the alternator assembly 14 output current is too low, the control unit 24 increases the resistance of the variable resistance generator 22. When the resistance of the variable resistance generator 22 is increased, the speed of rotation of the planet gear carrier 34 decreases and the speed of rotation of the ring gear 36, and the rotor shaft assembly 16, increases. As the speed of rotation of the ring gear 36 increases, the frequency of the alternator assembly 14 output current also increases. Thus, the control unit 24 is structured to maintain the frequency of the alternator assembly 14 output current within a selected range by increasing or decreasing the resistance of the variable resistance generator 22, thereby causing the rotor shaft assembly 16 to rotate at a speed within a selected range. Preferably, the control unit 24 is structured to maintain the alternator assembly 14 output current frequency between about 50 and 70 Hz, and more preferably about 60 Hz.

In this configuration, the alternator system 10 may adapt to changes in the speed of the source of rotation. However, rapid changes in the speed of the source of rotation, e.g. when the truck shifts gears, may cause too rapid of a change for the variable resistance generator 22. Thus, a further improvement to the alternator system 10 includes a ring gear 36 with an increased mass that acts as a flywheel.

While specific embodiments of the invention have been described in detail, it will be appreciated by those skilled in the art that various modifications and alternatives to those details could be developed in light of the overall teachings of the disclosure. For example, the planet gear carrier body 60 may have a shape other than a torus so long as the body has a portion that is a generally circular outer radial surface. That is, the planet gear carrier may have a square body with a generally circular groove cut into the outer surface. Further, while the planetary gear assembly 20 is disclosed as having the input shaft 12 coupled to the sun gear 30, the ring gear 36 coupled to the alternator assembly 14, and the components of the planetary gear assembly 20 are controlled by the variable resistance generator 22, the connections between the components could be rearranged and still perform, essentially, the same function. Further, the invention as described above relies upon a planet gear carrier body outer radial surface 68 having teeth and which is structured to engage another toothed gear. However, in a less preferred embodiment, the planet gear carrier body outer radial surface 68 may be a generally smooth belt surface structured to operatively engage a belt. Accordingly, the particular arrangements disclosed are meant to be illustrative only and not limiting as to the scope of invention which is to be given the full breadth of the claims appended and any and all equivalents thereof.

What is claimed is:

1. An alternator system comprising:
    an input shaft structured to be coupled to a source of rotation;
    an alternator assembly having an rotor shaft assembly, said alternator assembly structured to produce an output current having a frequency, said rotor shaft assembly having an external end;
    a planetary gear assembly disposed between, and operatively coupled to, said input shaft and said rotor shaft assembly, said planetary gear assembly having a planet gear carrier body with a generally circular outer radial surface, said planet gear carrier outer radial surface having teeth;
    a variable resistance generator having an external generator shaft with a generator gear, said generator gear structured to operatively engage said outer radial surface teeth;
    a control unit structured to detect the frequency of said alternator assembly output current and to alter the resistance of said generator;
    wherein, as said input shaft rotates, said planetary gear assembly rotates said alternator assembly rotor shaft assembly and said alternator assembly produces an output current having a frequency; and
    wherein said control unit is structured to maintain the frequency of said alternator assembly output current within a selected range by increasing or decreasing the resistance of said generator, thereby causing said planetary gear assembly to rotate at a speed within a selected range.

2. The alternator system of claim 1, wherein said control unit is structured to maintain the alternator assembly output current frequency between about 50 and 70 Hz.

3. The alternator system of claim 2, wherein said control unit is structured to maintain the alternator assembly output current frequency at about 50 Hz.

4. The alternator system of claim 1, wherein:
    said planetary gear assembly further includes a sun gear, at least two planet gears, and a ring gear; and
    wherein each of said sun gear, said at least two planet gears, said ring gear and said planet gear carrier may rotate.

5. The alternator system of claim 1, wherein:
    said planetary gear assembly further includes a sun gear, at least two planet gears, and a ring gear;
    said sun gear being fixedly coupled to said input shaft;
    said ring gear being directly coupled to said rotor shaft assembly, said ring gear having a toothed inner surface;
    said at least two planet gears being rotatably coupled to said planet gear carrier; and
    said at least two planet gears operatively engaging both said sun gear and said ring gear whereby rotation of said input shaft causes said rotor shaft assembly to rotate.

6. The alternator system of claim 5, wherein said ring gear has an increased mass and acts as a flywheel.

7. The alternator system of claim 1
    wherein said variable resistance generator is structured to receive an input current; and
    said control unit is structured to maintain the frequency of said alternator assembly output current within a selected range by increasing or decreasing said variable resistance generator input current.

8. A vehicle comprising:
    an engine that acts as a source of rotation;
    an alternator system having an input shaft, a planetary gear assembly, a variable resistance generator, and a control unit;
    said input shaft coupled to said source of rotation, an alternator assembly having an rotor shaft assembly, said alternator assembly structured to produce an output current having a frequency, said rotor shaft assembly having an external end;
    said planetary gear assembly disposed between, and operatively coupled to, said input shaft and said rotor shaft assembly, said planetary gear assembly having a planet gear carrier body with a generally circular outer radial surface, said planet gear carrier outer radial surface having teeth;
    said variable resistance generator having an external generator shaft with a generator gear, said generator gear structured to operatively engage said outer radial surface teeth;
    said control unit structured to detect the frequency of said alternator assembly output current and to alter the resistance of said generator;
    wherein, as said input shaft rotates, said planetary gear assembly rotates said alternator assembly rotor shaft assembly and said alternator assembly produces an output current having a frequency; and
    wherein said control unit is structured to maintain the frequency of said alternator assembly output current within a selected range by increasing or decreasing the resistance of said generator, thereby causing said planetary gear assembly to rotate at a speed within a selected range.

9. The vehicle of claim 8, wherein said control unit is structured to maintain the alternator assembly output current frequency between about 50 and 70 Hz.

10. The vehicle of claim 9, wherein said control unit is structured to maintain the alternator assembly output current frequency at about 60 Hz.

11. The vehicle of claim 8, wherein;
    said planetary gear assembly further includes a sun gear, at least two planet gears, and a ring gear; and
    wherein each of said sun gear, said at least two planet gears, said ring gear and said planet gear carrier may rotate.

12. The vehicle of claim 8, wherein:
    said planetary gear assembly further includes a sun gear, at least two planet gears, and a ring gear;
    said sun gear being fixedly coupled to said input shaft;
    said ring gear being directly coupled to said rotor shaft assembly, said ring gear having a toothed inner surface;
    said at least two planet gears being rotatably coupled to said planet gear carrier; and
    said at least two planet gears operatively engaging both said sun gear and said ring gear whereby rotation of said input shaft causes said rotor shaft assembly to rotate.

13. The vehicle of claim 12, wherein said ring gear has an increased mass and acts as a flywheel.

14. The alternator system of claim 8
    wherein said variable resistance generator is structured to receive an input current; and
    said control unit is structured to maintain the frequency of said alternator assembly output current within a selected range by increasing or decreasing said variable resistance generator input current.

* * * * *